(12) United States Patent
Zweighaft et al.

(10) Patent No.: US 6,801,383 B2
(45) Date of Patent: Oct. 5, 2004

(54) METHOD FOR CALIBRATING A TAPE MEDIA USING STAGGERED CALIBRATION TRACKS

(75) Inventors: James Zweighaft, Boulder, CO (US); Clark Milo Janssen, Loveland, CO (US); Timothy Joe Kindvall, Westminster, CO (US)

(73) Assignee: Quantum Corporation, Milpitas, CA (US)

( * ) Notice: Subject to any disclaimer, the term of this patent is extended or adjusted under 35 U.S.C. 154(b) by 377 days.

(21) Appl. No.: 10/072,290

(22) Filed: Apr. 4, 2002

(65) Prior Publication Data

US 2003/0189783 A1 Oct. 9, 2003

(51) Int. Cl.[7] .............................. G11B 5/584; G11B 5/55; G11B 15/48
(52) U.S. Cl. .................. 360/77.12; 360/78.02; 360/74.1; 360/72.1
(58) Field of Search ................................. 360/77.12, 75, 360/78.02, 74.1, 77.01, 72.1, 72.2, 72.3, 31

(56) References Cited

U.S. PATENT DOCUMENTS

| 4,476,503 A | | 10/1984 | Solhjell |
| 5,371,638 A | * | 12/1994 | Saliba ..................... 360/77.12 |
| 6,665,137 B2 | * | 12/2003 | Zweighaft et al. ......... 360/72.1 |

* cited by examiner

Primary Examiner—Andrew L. Sniezek
(74) Attorney, Agent, or Firm—Patton Boggs LLP

(57) ABSTRACT

A staggered calibration track comprising a plurality of calibration tracks for use positioning a tape drive tape head for reading and writing data to and from multiple data tracks. The staggered calibration track is written by positioning the write head to a predetermined location and moving the tape media horizontally as the vertical position of the tape head is incremented in a stepwise alignment. Locating one of the plurality of calibration tracks is accomplished by positioning the read head at the predetermined location corresponding to the edge of the particular calibration track and moving the tape media horizontally as the read head output is recorded. The particular calibration tracks vertical position is derived using the average read head output.

4 Claims, 7 Drawing Sheets

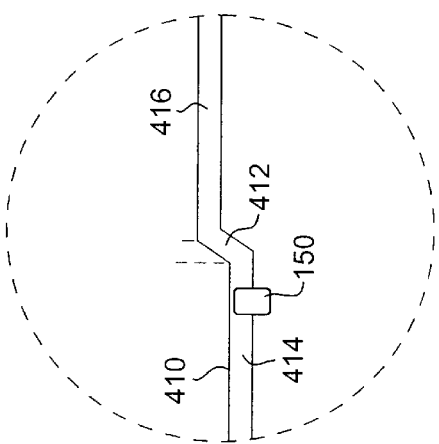
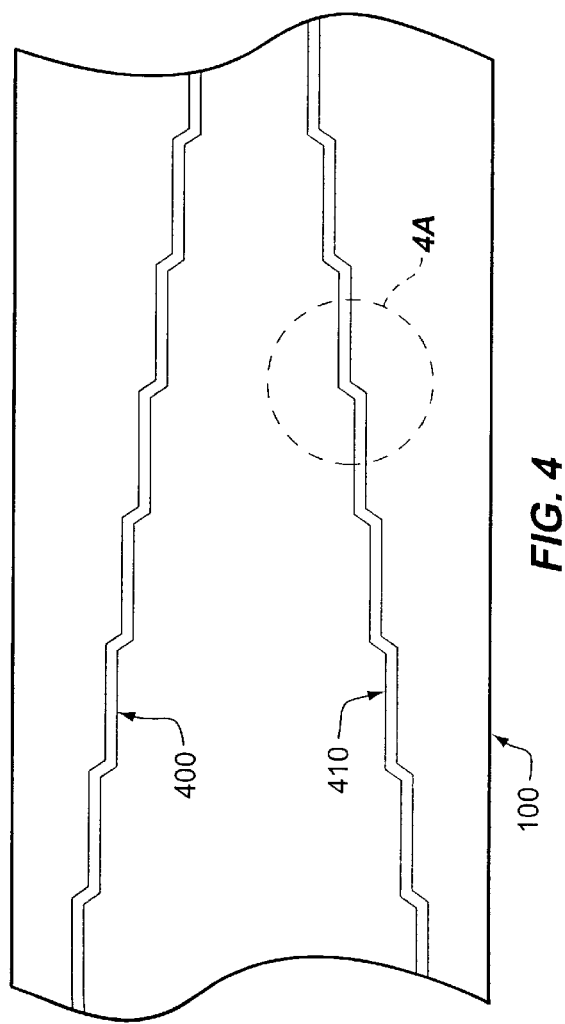

METHOD FOR CALIBRATING A TAPE MEDIA USING STAGGERED CALIBRATION TRACKS

FIELD OF THE INVENTION

The invention relates to data storage devices that record data in a series of closely spaced data tracks and in particular, to a method for calibrating a tape media using staggered calibration tracks.

PROBLEM

It is a long standing problem in the field of digital tape drives to align the tape head to avoid recording data on a previously written data track while also providing an increased number of data tracks on the length of tape media. Data storage on tape media typically involves recording flux transitions in a series of narrow data tracks which are spaced closely together to maximize the amount of data that can be stored in a given length of tape media. During the recording process, the tape media is moved past the tape head as flux transitions are imparted in a thin line referred to as a data track.

For linear recording tape devices, the data tracks have definite starting and stopping points. Normally, tape media motion continues in a straight line until the end of the tape media is reached and the tape media is stopped. This motion is referred to a single pass and for purposes of discussion will be defined to be in the horizontal direction. Motion perpendicular to a recorded data track will be defined to be in the vertical direction. For the class of tape drives under discussion, the tape head is held still at a fixed vertical position during each pass while the tape media travels between a supply reel and a take up reel.

A tape head assembly often has multiple magnetic gaps allowing it to record more than one data track simultaneously. In early designs it was common for a multi-gap tape head to write a limited number of relatively wide data tracks covering the full width of the tape media in a single pass. Some blank space was left between the data tracks to reduce interference from adjacent data tracks. The vertical distance between adjacent data tracks was largely dependent on the tolerances of the tape head itself which was fixed in a single position.

Improvements in recording technology have made it possible to read and write very narrow data tracks, provided the read and write heads in the tape head are spaced much further apart than the width of a single data track. This requirement necessitated a new technique to write data tracks spaced closely or even directly adjacent to one another. One common method is to move the tape head perpendicular to the direction of tape media travel. Before a recording pass, the tape head is moved by an amount equal to one data track width and then held in that position for a complete pass of the tape media. Subsequently, tape media movement is stopped and restarted in the opposite direction, and writing begins again with one or more write heads positioned near the previously recorded data track or tracks. In this way, a large number of data tracks covering most of the tape media surface can be recorded by a small number of write heads, at the expense of a making a mechanism to move the tape head.

When the end of the tape media is reached, the tape head position is changed and the tape media must be stopped and then restarted in the opposite direction. The time required at the end of a pass to decelerate, stop and accelerate the tape media in the opposite direction represents an undesired interruption of the recording or playback process. To avoid additional delays from rewinding the tape, it is common to simply reverse the direction of reading or writing once the end of tape media is reached. This method is known in the art as "serpentine" recording in view of the shape of the back and forth path traveled by the tape head relative to the tape media. In other words, data is written or read left to right during one pass and right to left during the next pass.

The ability to accurately locate and vertically position the tape head before each pass is of great importance. If the tape head position is incorrect, it is possible to record new data tracks partially or even completely overlapping previously recorded data tracks. In this case, reproducing the older data becomes difficult or impossible. Conversely, if the data tracks are too far apart the tape media capacity is wasted.

All tape head motions must be made relative to a known reference point. One early scheme used the physical end of travel of the moving tape head mechanism as a starting or "zero" point. This scheme worked well as long as the tolerances between the tape head bracket assembly, the base plate and the tape guides were all well known and constant.

An improved system, taught by U.S. Pat. No. 4,476,503 Solhjell, uses the edge of tape media as a reference point. The tape drive automatically locates the edge relative to one of the read heads in the tape head. This is done by first moving the tape head so low that both a read and write head, which are in line with each other, are positioned below the edge of the tape media. The read head is turned on at the same time that tape media is moved and the tape head vertically upward until the read head detects a signal from the tape media. This method eliminates several sources of positioning errors although the tape head must still move in imprecise increments from the reference point at the edge of the tape media to the next data track. However, a problem occurs due to wear on the edge of the tape media as well as imprecision finding that edge, which will contribute to an overall position error.

A further improvement in data track locating systems uses one or more calibration or reference tracks written for a short distance at the beginning of the tape media. A solution used by Quantum Corporation of Milpitus, Calif. uses two forward and two reverse calibration tracks written in an otherwise blank section of tape media known as the calibration area. The two forward calibration tracks are written simultaneously by separate write heads in the tape head assembly while the tape media is moved in the forward direction through the calibration area. The two reverse calibration tracks are likewise written in the opposite direction in the same horizontal area, but at a different vertical location to avoid interference with the forward calibration tracks.

Typically, the calibration area is located at the beginning of the tape and uses only a small fraction of the tape media length. Once calibration tracks are written on the tape media, the calibration tracks are not rewritten unless the entire tape media is erased. If additional data needs to be recorded on a partially recorded tape media, the calibration tracks are first located and used as a starting reference point to locate the next data track of interest. This method eliminates the problem of tape edge wear and reduces the distance the tape head must move vertically from the measured calibration tracks to the next data track of interest.

Once the calibration tracks are located, all forward data tracks are written at fixed vertical offsets relative to the forward calibration tracks and all reverse data tracks are likewise written at fixed vertical offsets relative to the reverse calibration tracks. This is necessary because tape media position shifts in the tape guides with changes in tape media direction. A problem with this solution is that it requires that the tape head be capable of moving a precise distance relative to the calibration tracks, thus using a tape head that is costly.

An alternative system described by U.S. patent application Ser. No. 09/876,705 proposes to write each calibration track as each data tracks is written instead of in a separate, prior operation. Each calibration track is essentially a preamble to each data track, and is not written until the tape drive is ready to write the data for that data track. After the preamble is written, the data track begins without any interruption of the tape motion or repositioning of the head assembly. While this system has numerous advantages there are also some limitations. For instance, because the tape may be removed from the drive before it is completely filled and then placed in another tape drive, subsequent calibration tracks may be written by a different tape drive. This results in undesired additional errors in the system as the tolerances between the two tape drives will vary.

For these reasons a need exists for tape media calibration that provides improved data track positioning by providing a plurality of calibration tracks corresponding to a plurality of data tracks without increasing the time required to for the tape dive to record the plurality of calibration tracks.

SOLUTION

The present method for calibrating a tape media using staggered calibration tracks provides increases the accuracy in aligning the tape head prior to reading or writing data to or from a data track. The staggered calibration track comprises a plurality of successive calibration tracks wherein each calibration track corresponds to one or more data tracks. The staggered calibration track is written by positioning the write head to a predetermined location, then incrementally adjusting the vertical position of the write head as the tape media is moved horizontally past the write head in a continuous manner. A forward staggered calibration track and a reverse staggered calibration track are written for use in aligning the tape head for reading or writing data to or from the tape media in the forward and reverse directions. Only one stop/start motion of the tape media is required after the forward calibration tracks are written and before the reverse calibration tracks are written which allows the operation to conclude quickly.

Instead of sweeping the tape head across the calibration track, the vertical position of each written calibration track is found by positioning the read head approximately straddling an edge of the calibration track. The vertical position of the particular calibration track is derived from the read head output which will be approximately half of the normal value due to the offset position. As the tape media moves up and down laterally the output will vary. Higher output levels indicate more head-track overlap while lower output levels indicate the opposite. The average read head output is used to determine the vertical position of the corresponding data tracks.

BRIEF DESCRIPTION OF THE DRAWINGS

FIG. 4 illustrates a forward and reverse staggered calibration track pattern on a length of tape media;

FIG. 4a illustrates a detailed view of a section of the staggered calibration track of FIG. 4;

DETAILED DESCRIPTION

Figure 1:
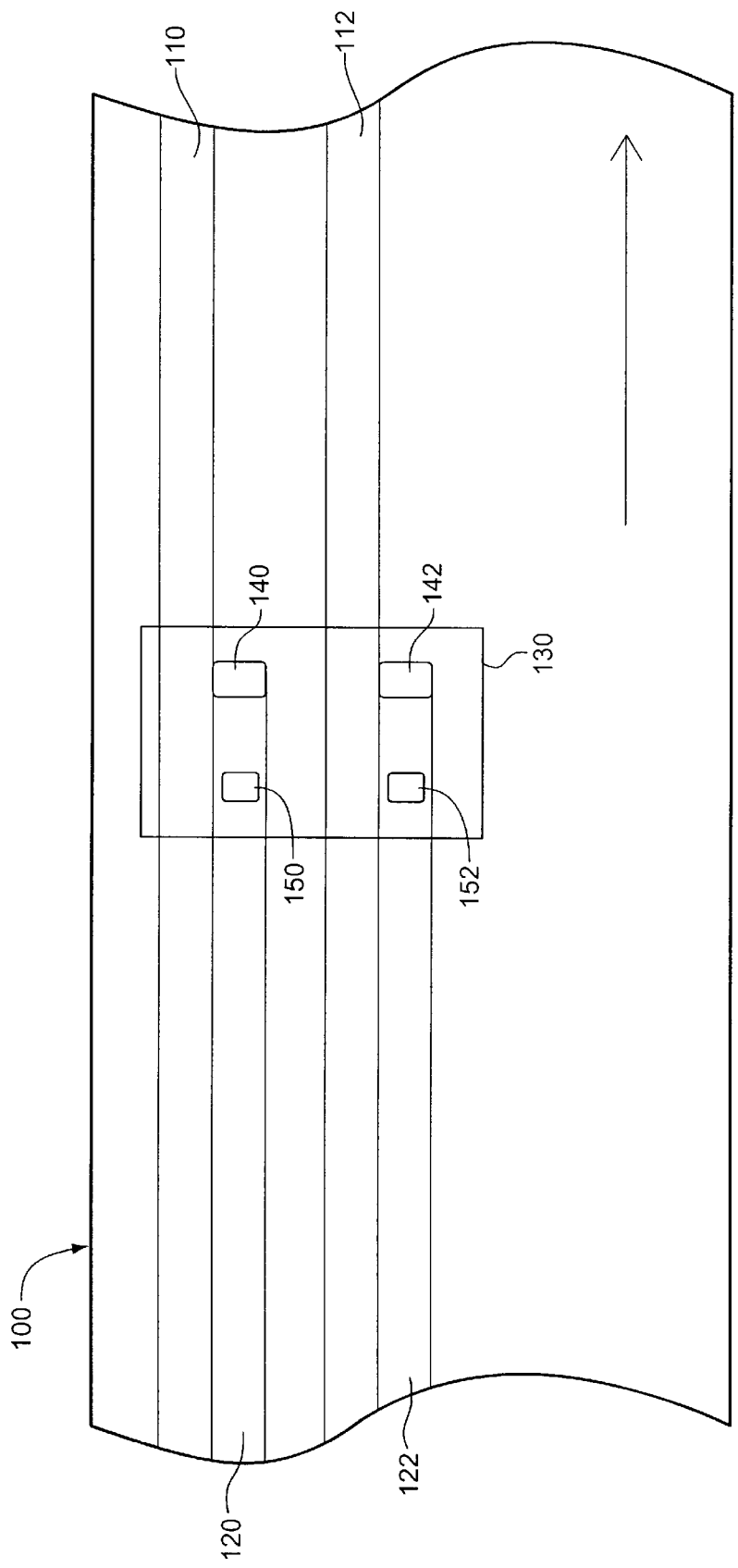
FIG. 1 illustrates a side view of a multi-gap tape head writing two adjacent data tracks on a length of tape media.

The staggered calibration tracks for improved track positioning summarized above and defined by the enumerated claims may be better understood by referring to the following detailed description, which should be read in conjunction with the accompanying drawings. This detailed description of the preferred embodiment is not intended to limit the enumerated claims, but to serve as a particular example thereof. In addition, the phraseology and terminology employed herein is for the purpose of description, and not of limitation.

Data storage on tape media typically involves recording flux transitions in a series of narrow data tracks which are spaced closely together to maximize the amount of data that can be stored in a given length of tape media. During the recording process, the tape media is moved past the tape head as flux transitions are imparted in a thin line referred to as a data track.

For linear recording tape devices, the data tracks have definite starting and stopping points. Normally, tape media motion continues in a straight line until the end of the tape media is reached and the tape media is stopped. This motion is referred to a single pass and for purposes of discussion will be defined to be in the horizontal direction. Motion perpendicular to a recorded data track will be defined to be in the vertical direction. For the class of tape drives under discussion, the tape head is held still at a fixed vertical position during each pass while the tape media travels between a supply reel and a take up reel.

A tape head assembly often has multiple magnetic gaps allowing it to record more than one data track simultaneously. Typically, it will also have distinct inductive recording transducers and reproducing sensors of various designs such as inductive or magneto-resistive devices. Together, these are often referred to simply as write heads and read heads. It is also common practice to refer to recording as writing and to refer to reproducing as reading. The term tape head can be used to refer to multiple read and write heads or sensors all mounted on a single block of material, the tape head, or it can be used to refer to a single read or write head in the tape head.

Before a recording pass, the tape head is moved by an amount equal to one data track width and then held in that position for a complete pass of the tape media. Subsequently, tape media movement is stopped and restarted in the opposite direction. While the tape media direction is changed, the tape head is brought into a new position. Writing begins again with one or more write heads positioned near the previously recorded data track or tracks. In this way, a large number of data tracks covering most of the tape media surface can be recorded by a small number of write heads. It is common for the tape media to contain hundreds of data tracks that are written two or more per pass. This method of recording multiple tracks is known in the art as serpentine recording in view of the shape of the back and forth path traveled by the tape head relative to the tape media. In other words, data is written or read left to right during one pass and right to left during the next pass.

The ability to accurately locate and vertically position the tape head before each pass is of great importance. If the tape head position is incorrect, it is possible to record new data tracks partially or even completely overlapping previously recorded data tracks. In this case, reproducing the older data becomes difficult or impossible. Conversely, if the data tracks are too far apart the tape media capacity is wasted. Vertical tape head adjustments are made relative to a known reference point. One or more calibration tracks are recorded by the tape drive prior to recording data on the data tracks and are not rewritten unless the entire tape media is erased. If additional data needs to be recorded on a partially recorded tape media, the calibration tracks are first located and used as a reference point to locate the next data track.

FIG. 1 illustrates a front view of a simple multigap tape head 130 writing two narrow data tracks 120 and 122 which are a distance apart and are written directly adjacent to previously recorded data tracks 110 and 112. Tape media 100 is shown transparently in this view to reveal write heads 140 and 142 and read heads 150 and 152. Write heads 140 and 142 maintain contact with tape media 100 as the media is moved in the forward direction indicated by an arrow in FIG. 1.

Write head 140 is enabled to impart flux transitions on the tape media as the tape media moves across it, writing data track 120 directly adjacent to previously written data track 110. Read head 150 is configured to be in line with write head 140 so that it may immediately read and thereby check the data as it is written on data track 120. Similarly, lower write head 142 imparts flux transitions to tape media 100, forming data track 122, which is checked by read head 152. The width of read heads 150 and 152 and write heads 140 and 142 relative to the width of tape head 130 and tape media 100 have been exaggerated for clarity. It is common for the read heads to be narrower than the write heads to allow for some vertical positioning error when reading.

Referring to FIG. 1, tape media 100 contains two data tracks 110 and 112 written on a previous pass when tape head 130 was positioned higher by one data track width. Tape head 130 is repositioned vertically after each pass so that write heads 140 and 142 are aligned below and adjacent to previously written data tracks 110 and 112. Once tape head 130 is settled into a fixed position, tape media 100 is moved again to complete a subsequent pass, forming two new data tracks 120 and 122 on tape media 100. Following the same process, a number of narrow data tracks are recorded two at a time to eventually cover most of the tape media surface.

Figure 2:
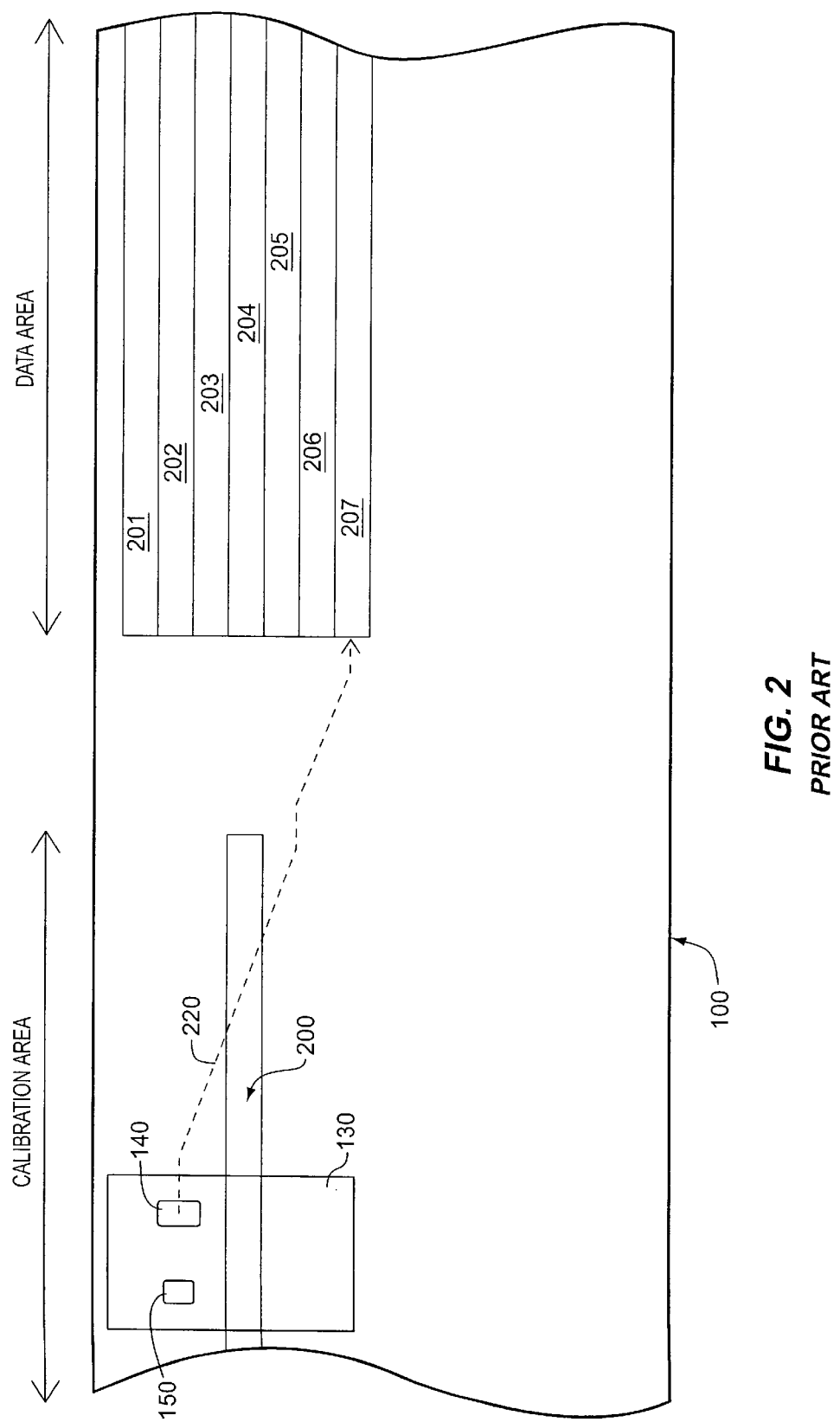
FIG. 2 illustrates a prior art calibration track on a length of tape media.

FIG. 2 illustrates the method employed in the prior art to locate a calibration track and move from the calibration track to the data track of interest. As tape media 100 travels from left to right horizontally, read head 150 is moved down along trajectory 220 and crosses over forward calibration track 200, which is written in a horizontally defined section of the tape media known as the calibration area. The area above and below forward calibration track 200 is blank so that the signal picked up by read head 150 increases from a low noise level to a much higher signal level as it crosses over calibration track 200. This change in signal level is used to determine the location of calibration track 200. Prior to writing forward data track 207, write head 140, which is in line with read head 150, is brought into position adjacent to forward data track 206. Also present on the tape media are data tracks 201–205 that are located above data tracks 206 and 207.

Because the mechanism that moves the tape head inevitably has some backlash, it is common practice to always approach calibration tracks and data tracks from the same direction even though this may entail extra movement of the tape head. While a downward stroke of the read head 150 is shown in FIG. 2, alternative designs use upward motions.

Figure 3:
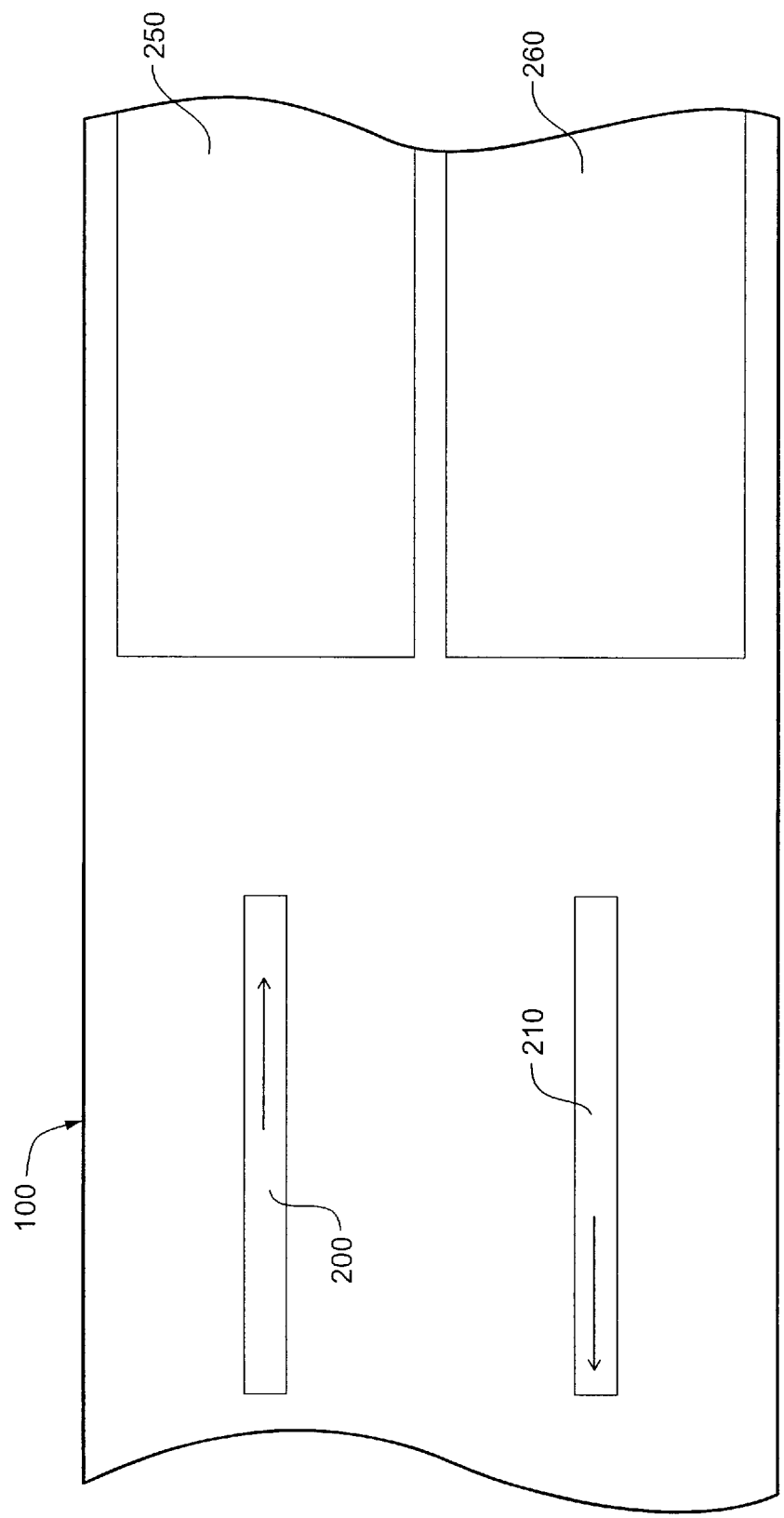
FIG. 3 illustrates a prior art forward and reverse calibration tracks on a length of tape media.

FIG. 3 illustrates a simplified front view of tape media 100 having a prior art calibration track layout. A forward calibration track 200 is located directly above reverse calibration track 210. The area above and below each of the calibration tracks 200 and 210 is blank. A large number of data tracks, illustrated as blocks 250 and 260 fill two distinct areas of tape media 100. The vertical position of data tracks located in block 250 of tape media 100 are written in reference to the vertical position of forward calibration track 200. Likewise, the vertical position of the reverse data tracks located in block 260 of tape media 200 are written in reference to the vertical position of reverse calibration track 210.

Once the vertical position of the calibration tracks are determined, the tape head is moved up or down by a predetermined vertical movement to the next data track. Accumulative errors occurring during this movement are not compensated for by the system. Therefore, it is desirable to write calibration track 200 near the center vertical position of the data tracks 250 they are associated with in order to minimize the "open loop" distance traveled by the tape head between the calibration tracks and the data tracks. The term open loop is commonly used in the art to indicate an operation whose output is not compared to a desired result. While the prior art forward and reverse calibration tracks are illustrated and discussed having one forward and one reverse calibration track, the prior art also includes calibration tracks having more than one forward and more than one reverse calibration track.

The present method for calibrating a tape media using staggered calibration tracks improves data track positioning and overcomes some of the limitations and problems of the prior art by writing a series of calibration tracks in a staggered alignment as illustrated in FIG. 4. One forward calibration track 400 and one reverse calibration track 410 are shown. A primary advantage of the staggered calibration track pattern is that all of the calibration tracks, which can number as many as one calibration track per data track, may be written in one continuous forward and one continuous reverse pass of the tape media. Only one stop/start motion of the tape media is required after the forward calibration tracks are written and before the reverse calibration tracks are written, greatly reducing the time required to calibration tracks. A system employing one calibration track per data track, each located horizontally coincident with each other, would require one time consuming stop/start action between every calibration track. Because of this limitation, prior art systems write a limited number of calibration tracks to minimize the time require to write or read the calibration tracks, thus increasing the error when moving the tape head from the known calibration track position to the next data track to be written or read.

Based on tape speeds typical in the industry today, a tape drive writing two staggered calibration tracks could do so in about twenty seconds. Because each step in the staggered pattern defines one head elevation, this can be equivalent to writing one calibration track per data track. If a tape drive had to write two hundred calibration tracks, one per data track, directly above and below each other, this would take about ten minutes due to the time required to stop and then restart tape motion in an opposite direction after each data track is written. Ten minutes is an unacceptably long time for this operation. Similar considerations and times apply to the reading of the calibration tracks. Because of this, it has heretofore been considered impractical to write one calibration track per data track prior to writing data on the tape media.

Figure 6:
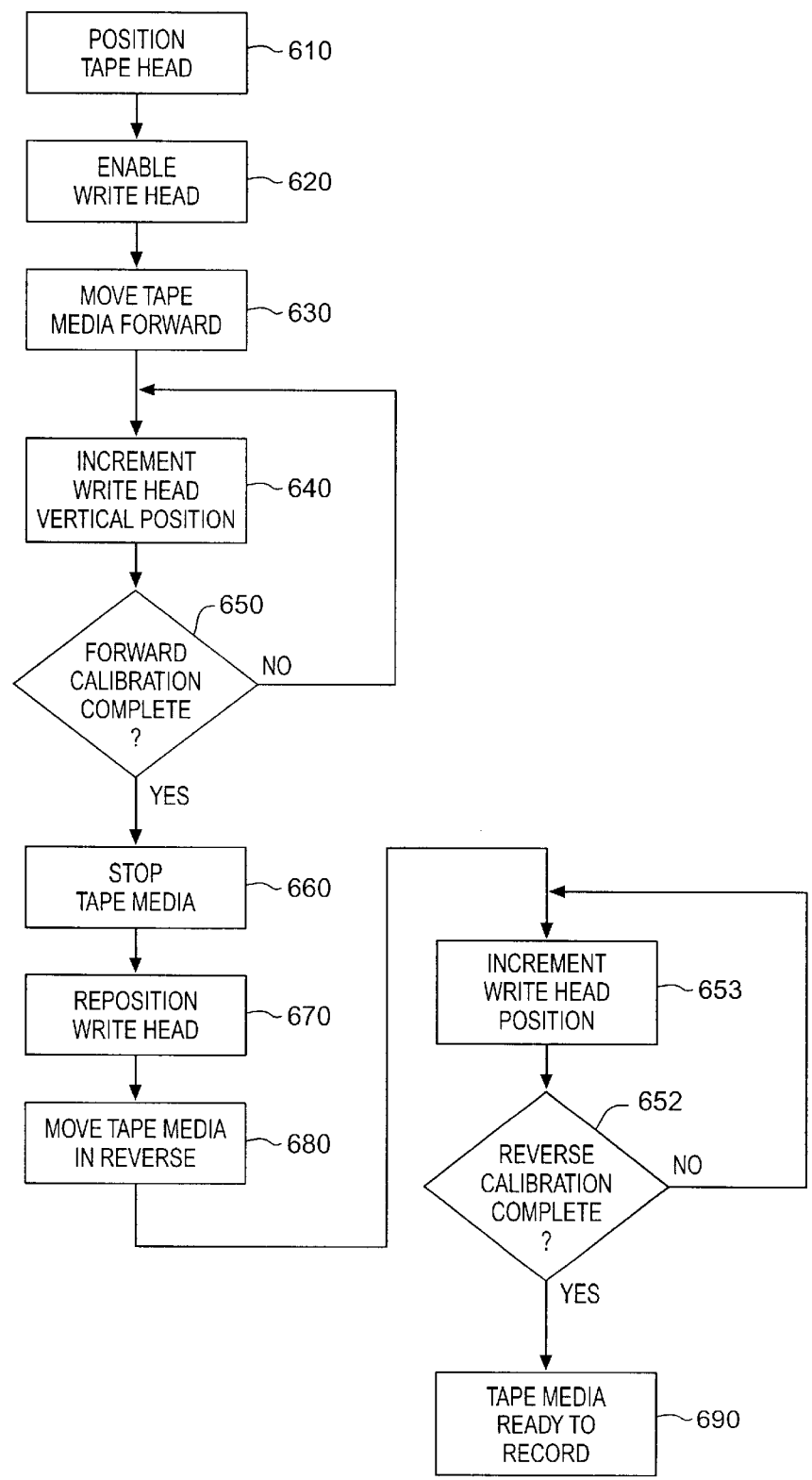
FIG. 6 is a flow diagram of the method of calibrating a tape media.

Calibrating a Tape Media—FIG. 6:

Prior to using a blank tape cartridge, the tape media is written with forward and reveres calibration tracks for use in locating each one of a plurality of forward and reverse data tracks. Writing a staggered calibration track pattern as shown in FIG. 4 requires that the tape head be moved up or down in a stepwise fashion while the tape media continues uninterrupted motion in the forward or reverse direction.

The forward staggered calibration track is written first. Referring to FIG. 6, in step 610 the tape head is moved to a predetermined starting vertical position for recording the first calibration track. Once the tape head is positioned in step 610 the write head is enabled in step 620 and the tape media is moved forward in step 630 as the first calibration track is written. The vertical position of the write head is incremented a predetermined amount in step 640 for writing each next successive calibration track until all of the forward calibration tracks have been written. When the tape drive write head has written the last calibration track in step 650, the tape media is stopped in step 650. A reverse staggered calibration track is written after repositioning the write head to a predetermined starting reverse vertical position in step 670, moving the tape media in reverse in step 680 as successive reverse calibration tracks are written. When the reverse staggered calibration track has been written in steps 652 and 653, the tape media is ready for recording data in step 690.

If the write heads are left on while the tape head is moved, a vertical sloping diagonal section of calibration track is also recorded connecting successive horizontal sections of tape media 100 wherein each successive vertical position recorded corresponds to a data track or a small group of data tracks. The diagonal section 412 of calibration track 410 shown in shown in FIG. 4a is not used by the tape drive when locating successive horizontal data tracks. In an alternative embodiment, the write head is turned off while the tape head moves vertically to eliminate the diagonal section of track between successive calibration tracks.

Those skilled in the art will appreciate that most of the advantages of a staggered calibration track pattern could be preserved even if the number of horizontal steps is less than the total number of data tracks. This would require that some open loop motion take place between the measured calibration track elevation and the vertical position of the next data track of interest in some cases. However, the distance between successive calibration tracks would be much smaller than in the prior art and thus less error would accumulate during vertical movement of the tape head. The purpose of multiple calibration tracks is primarily to define and record the errors associated with the tape head positioning mechanism for the tape drive being used, which may be accomplished with fewer calibration tracks than the total number of data tracks. Once so defined and recorded, these errors may be taken into account when the tape cartridge is used in another tape drive.

Figure 7:
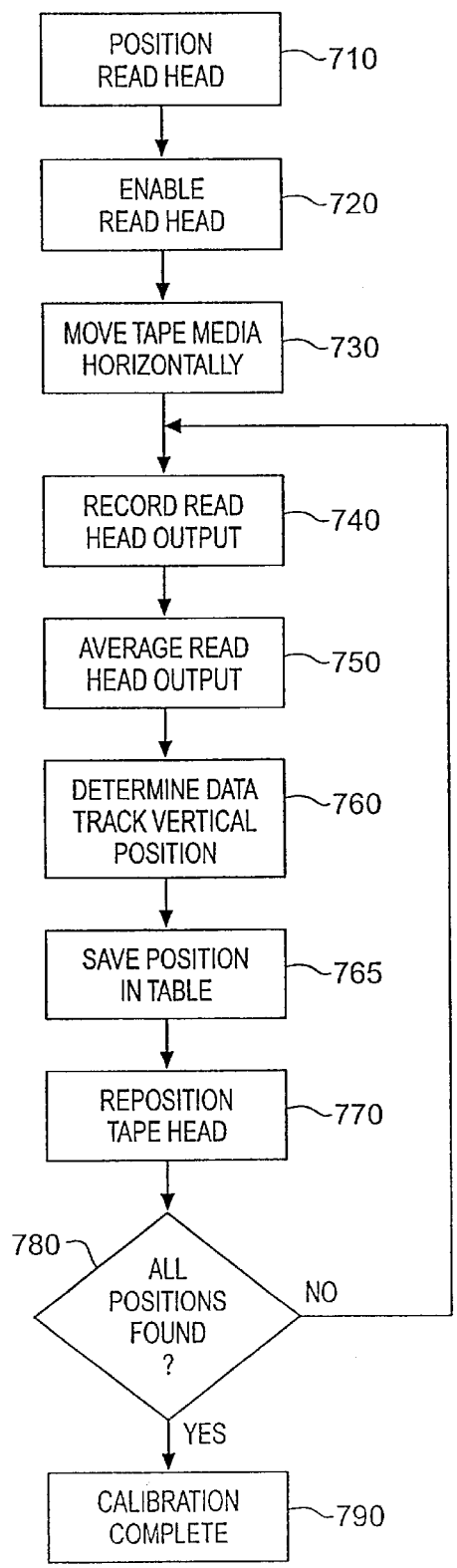
FIG. 7 is a flow diagram of the method of locating a data track on a tape media having staggered calibration.

Locating a Data Track—FIG. 7:

The staggered calibration track vertical positions may be found by using the conventional sweeping tape head movement of the prior art described previously, however this method does not work well for a staggered calibration track pattern. Due to variable backlash in the mechanism, it is impractical to measure calibration track vertical elevation while sweeping the tape head downward in some cases and upward in others. Additionally, this method requires the tape head to start from a position well below the calibration track and continue to a position well above the calibration track. If the tape head position at the end of the first sweep is above the desired starting position of the second sweep, the tape head will have to be moved downward before the second sweep can begin. To overcome backlash, additional downward movement is required. As tape media travel continues uninterrupted while the tape head is repositioned, this results in undesired tape media consumption. The problem can be solved by using an alternative method of finding the staggered calibration tracks.

FIG. 4a illustrates a section of the staggered calibration track 410. A first straight section 414 is connected to a second straight section 416 which was written at a higher vertical position. The two sections are connected by diagonal section 412 as previously discussed. The area above and below calibration track 410 is blank. Referring to FIG. 7, the alternative method of locating the calibration track requires that read head 150 be positioned in step 710 approximately straddling the lower or upper edge of horizontal calibration track section 414. This requires that the tape head mechanism have enough accuracy to approximately locate (within the width of the read head) the edge of calibration track 414 before the exact vertical position is determined in a subsequent operation. As the tape media is moved horizontally in step 730 the read head output is recorded in step 740. As is well known in the art, the output from read head 150 will be greater or lesser, depending on how much it overlaps calibration track 414. If there are no initial errors in placement of read head 150, exactly one half of read head 150 will overlap calibration track section 414, while the other half will lie below in the blank area. The output from read head in this position will be approximately one-half its maximum value. If calibration track section 414 is lower, read head 150 will cover more of calibration track 414 and its output will be higher. Therefore, the magnitude of the read head output can be used in step 760 to find the edge (and by inference, the center) of the calibration track section 414. The vertical position of each section of the calibration track is saved in a table at step 765 for subsequent use at a later time when data is recorded or read. Once the elevation of a particular section has been found, the tape head is repositioned to the approximate location of the next section of the calibration track and the process is repeated (steps 740–780) until all sections have been located in step 790.

Finding the exact vertical position of a calibration track is complicated by slight up and down movement of the tape media which inevitably occurs whenever the tape media is moved forward or backward. Such motion, known as lateral tape motion, or LTM, must be held to a minimum in a serpentine recording tape drive, but is not completely eliminated. Those skilled in the art will appreciate that imperfections such as wobble in the reels and guide rollers are a major contributing factor to LTM. It is important to note that this source of error is not corrected by prior art methods of locating calibration tracks. This is because the speed of the tape head sweeping across the calibration track exceeds the frequency of the LTM. Thus, the tape head might cross the calibration track at a low point and the system will think the entire calibration track is low when in fact its average position is somewhat higher. Conversely, the tape head might sweep over the calibration track at a high point and mistakenly indicate that the entire calibration track is higher than it is. LTM contributes significantly to the overall error and therefore limits the amount of data which can be recorded on a tape media.

Figure 5:
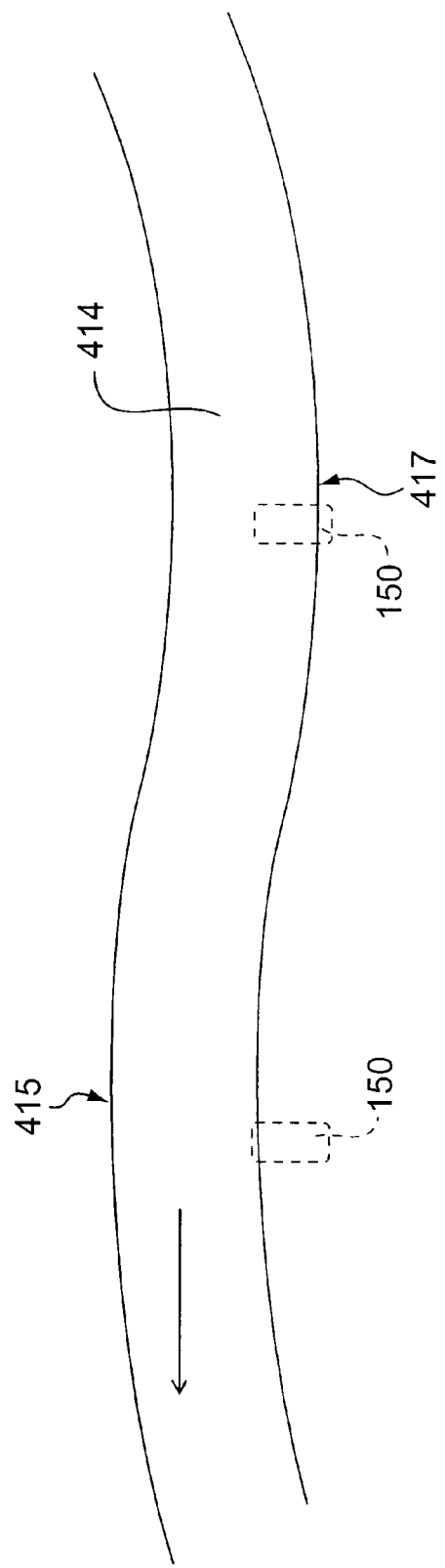
FIG. 5 illustrates a section of a calibration track recorded on a length of tape media during lateral tape motion.

FIG. 5 illustrates the effect of LTM in a calibration track section 414. Instead of being in a completely straight line, in practice the calibration track appears to be curved. In FIG. 5, calibration track 414 is moving substantially from right to left but also up and down slightly while read head 150 is stationary. As calibration track 414 moves past read head 150, read head will encounter high spots such as position 415 which result in a low output signal from the read head 150 because only a small portion of the read head is over calibration track 414 at the time. Likewise, read head 150 will encounter low spots such a position 417 where the output is higher than average because a larger portion of read head 150 overlaps the recorded calibration track 414. The read head output is averaged to yield an average calibration track vertical position and thus remove a primary source of error. Locating a calibration track within the present method for calibrating a tape media using staggered calibration tracks also reduces the amount of tape media used (luring calibration because the sweeping head motions of the prior art calibration track crossing method are eliminated. As the read head travels from one horizontal section of the tape to the next, it is moved vertically upward. No downward vertical motions are required, which eliminates any complications from backlash in the tape head mechanism.

Another advantage of using the staggered calibration tracks can be achieved by recording the maximum and minimum read head output levels while reading calibration tracks. The read head output levels should be between the noise level when reading blank tape and the maximum possible output read head signal when the read head is completely overlapping the calibration track. If the read head output reaches the maximum or minimum level during calibration, an undesired excessive LTM situation is noted. One possible response of the system would be to flag the particular tape media for read only operation to avoid accidental overwrite of adjacent data tracks due to the excessive LTM. Reading is still possible, although reading would be slow due to excessive errors and read retries. A second possible response could be to inform the operator that the tape is worn or possibly damaged. If multiple read operations on the same tape drive all show excessive LTM, the system may conclude that the tape drive itself is at fault. Automatic measurement of Lateral Tape Motion therefore not only reduces calibration error but also aids self diagnostics of the tape cartridge and tape drive.

Those skilled in the art will appreciate that the horizontal tape distance required to write a staggered calibration track may be much longer than that used in the prior art. This would reduce the tape media area available to write data if the common rule that these two areas do not overlap is followed. However, with the present method for calibrating a tape media using staggered calibration tracks the calibration area is not a fixed horizontal section of tape media. Rather, it is as a diagonal section, which allows data tracks to be written above and below the staggered calibration tracks to make best use of the available tape media area. Therefore, the data tracks are interrupted by the diagonal calibration area. However, tape drives are equipped for such interruptions.

As to alternative embodiments, those skilled in the art will appreciate that the present method for calibrating a tape media using staggered calibration tracks can include one calibration track per data track or an alternative number of calibration tracks. Likewise, although the method of locating one of the calibration tracks has been described first positioning the read head at the lower edge of the calibration track, the read head could be positioned in an alternative vertical position such as the upper edge of the calibration track.

It is apparent that there has been described a method for calibrating a tape media using staggered calibration tracks that fully satisfies the objects, aims, and advantages set forth above. While the method for calibrating a tape media using staggered calibration tracks has been described in conjunction with specific embodiments thereof, it is evident that many alternatives, modifications, and/or variations can be devised by those skilled in the art in light of the foregoing description. Accordingly, this description is intended to embrace all such alternatives, modifications and variations as fall within the spirit and scope of the appended claims.

What is claimed is:

1. A method for a tape drive for writing a forward staggered calibration track on a length of magnetic tape media, the forward staggered calibration track comprising a plurality of calibration track sections, each one of the plurality of calibration sections horizontally offset from each other one of the plurality of calibration track sections, wherein each one of the plurality of calibration track section corresponds to one or more of a plurality of forward data tracks, the method comprising:
   aligning a write head to a predetermined starting forward vertical position;
   enabling the write head to write on the length of magnetic tape media;
   moving the length of magnetic tape media forward in a horizontal direction; and
   changing the vertical position of the write head in a stepwise alignment as the length of magnetic tape media is moving past the write head, wherein as the length magnetic tape media is moved horizontally the write head writes the plurality of calibration track sections.

2. The method of claim 1 further comprising:
   disabling the write head while incrementing the vertical position of the write head.

3. The method of claim 1 for further writing a reverse staggered calibration track on a length of magnetic tape media, the reverse staggered calibration track comprising a plurality of calibration track sections, each one of the plurality of calibration sections horizontally offset from each other one of the plurality of calibration track sections, wherein each one of the plurality of calibration track section, wherein each one of the plurality of reverse calibration tracks corresponds to one or more of a plurality of reverse data tracks, the method comprising:
   stopping the horizontal movement of the tape media;
   aligning the write head to a predetermined reverse starting vertical position;
   enabling the write head to write on the length of magnetic tape media;
   moving the length of magnetic tape media reverse in the horizontal direction; and
   decrementing the vertical position of the write head downward in a stepwise alignment as the length of magnetic tape media is moving past the write head, wherein as the length magnetic tape media is moved horizontally the write head writes the plurality of reverse calibration tracks.

4. A calibration method for use by a tape drive for locating a one of a plurality of forward/reverse data tracks on a magnetic tape media having a forward and a reverse staggered calibration track located on a length of the magnetic tape media, wherein the forward and the reverse staggered calibration tracks each comprises a plurality of calibration tracks, each one of the plurality of calibration tracks corresponding to one or more of the plurality of forward/reverse data tracks, the method comprising:

reading the one of the plurality of forward/reverse calibration tracks on the length of tape media corresponding to the one of the forward/reverse data tracks being located, wherein the reading comprises:

positioning a read head at a predetermined position corresponding to the one of the plurality of forward/reverse calibration tracks;

moving the length of tape media horizontally forward/reverse as the read head reads the one of the plurality of forward/reverse calibration tracks;

recording two or more read head outputs as the read head is reading the one of the plurality of forward/reverse calibration tracks;

averaging the two or more read head outputs to determine an averaged vertical position for the one of the plurality of forward/reverse calibration tracks; and aligning a tape head to a predetermined position derived from the averaged vertical position to locate the one of the plurality of forward/reverse data tracks corresponding the to the one of the plurality of forward/reverse calibration tracks.

* * * * *